April 19, 1932.  S. B. STINE  1,854,528
MOLDING APPARATUS
Filed May 31, 1930
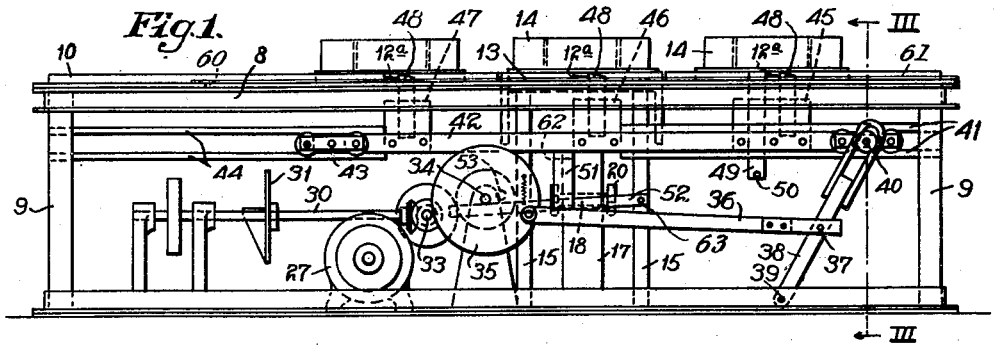
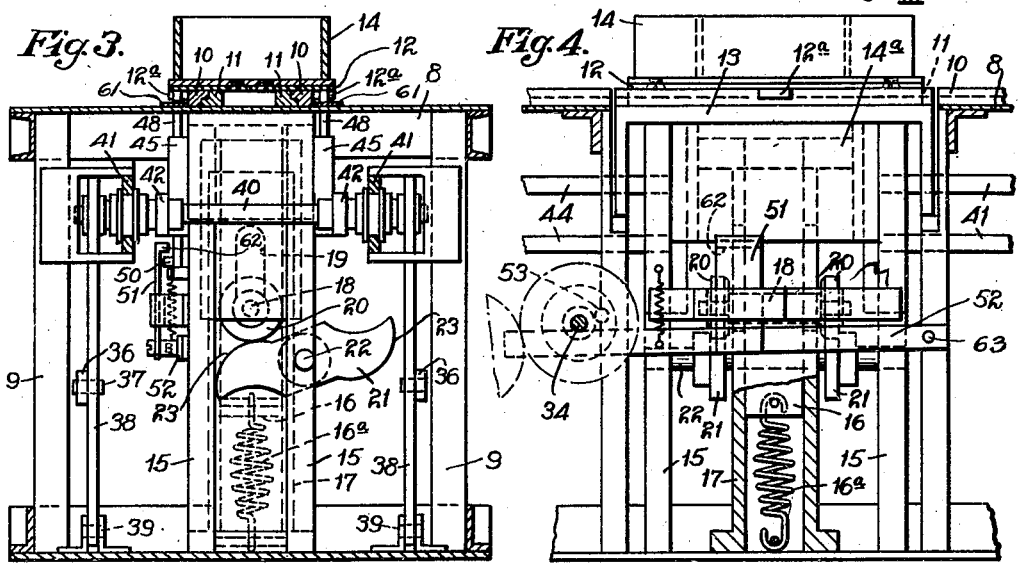
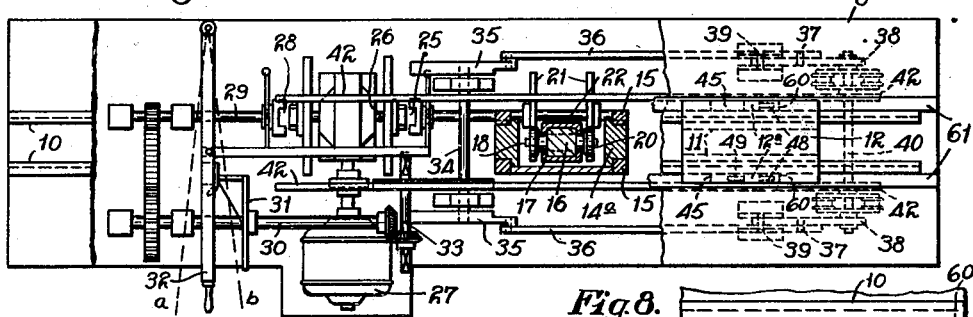
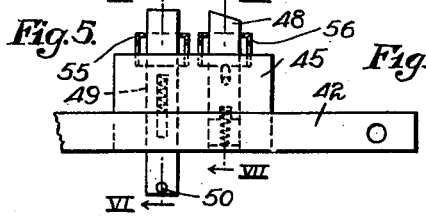
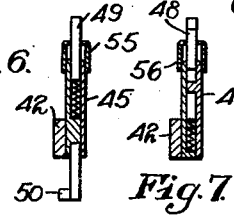
INVENTOR
Samuel Blaine Stine,
By Archworth Martin,
Attorney.

Patented Apr. 19, 1932

1,854,528

UNITED STATES PATENT OFFICE

SAMUEL BLAINE STINE, OF OSCEOLA MILLS, PENNSYLVANIA

MOLDING APPARATUS

Application filed May 31, 1930. Serial No. 458,851.

My invention relates to molding apparatus of the type wherein the molds are subjected to a jolt-ramming operation to consolidate or to compact the molding material in the molds, and more particularly to a jolt ramming molding machine, wherein the molds are intermittently moved along a supporting table onto and off the jarring table.

One object of my invention is to provide improved mechanism for intermittently advancing the molds through the machine, including means for centralizing the molds on the jarring table.

Another object of my invention is to provide improvements in the construction, location and arrangement of the mechanism employed in bringing about the jolt-ramming operation of the molds.

Still another object of my invention is to provide improved means for guiding and supporting molds in their travel through the machine whereby molds of various shapes, sizes and types may be equally and effectively employed, thereby increasing the capacity and usefulness of the machine.

A further object of the invention is to provide a machine of the type above-referred to, with means for protecting various of the parts from exposure to sand, dirt, etc., which is ordinarily present in this type of machine and causes damage to the various parts thereof.

A still further object of the invention is to simplify and improve generally the structure and operation of molding machines of the type above-referred to.

One of the forms which my invention may take is shown in the accompanying drawings wherein, Figure 1 is a side elevational view of a molding apparatus constructed in accordance with my invention; Fig. 2 is a plan view thereof with part of the table broken away to show the driving mechanism; Fig. 3 is a view, on an enlarged scale, taken on the line III—III of Fig. 1; Fig. 4 is an enlarged sectional elevational view of a portion of the apparatus of Fig. 1; Fig. 5 is a fragmentary detail view of another portion of the apparatus of Fig. 1; Figs. 6 and 7 are sectional views taken on the lines VI—VI and VII—VII, respectively, of Fig. 5, and Fig. 8 is a fragmentary view of a portion of the apparatus of Fig. 2.

The table as a whole is indicated by the reference numeral 8 and is mounted upon suitable framework 9. The table 8 is provided with guide rails 10 that are undercut as shown more clearly in Fig. 3, so that guide bars 11 secured to the undersides of mold-supporting plates 12 may have interfitting engagement therewith. The plates 12 are provided with downwardly projecting lugs 12a positioned centrally of the plates and outwardly of the guide bars 11. The plates 12 are held against lateral and vertical movements by the co-operation of the rails 10 and the bars 11, but they are slidable longitudinally of the table 8, in a manner to be hereinafter described. The table 8 has a jarring or jolt-ramming table section 13 that is also provided with guide rails similar to and forming continuations of the guide rails 10. The jarring table is vertically movable by jolt-ramming mechanism as hereinafter described.

The plates 12 are provided for supporting molds 14 for movement onto and off the jarring table 13, the molds being secured to the plates in any suitable manner. By the provision of the plates 12, molds of various types and sizes may be employed, and be effectively brought into position on the jarring table 13 and be subjected to a jolt ramming operation to compact the mold material therein, without the necessity of altering such molds.

Another advantage of the plates resides in the provision of means for accurately positioning the molds carried thereby centrally of the jarring table without in any way disturbing the normal operating adjustments of the actuating mechanism, which would ordinarily be required to accommodate various types and sizes of molds.

The jarring table 13 is supported upon an anvil 14a that is supported by posts 15. The table 13 is provided with a central post or plunger member 16 which extends downwardly through the anvil 14a and has slidable engagement in a guide or plunger casing 17 so that the table is guided in its vertical movements. A tension spring 16a has its one end secured to the plunger 16 and its other end secured to the plunger casing 17. The plunger 16 carries a shaft 18 which extends through slots 19 in the plunger casing and carries rollers 20 on its ends. The rollers 20 are intermittently engaged by propeller cams 21 having curved wing portions 23 at their outer ends and which are mounted on a shaft 22, the shaft 22 being offset from the vertical center line of the jarring table, and from the axis of the shaft 18, so that during rotation of the shaft, the wing portions 23 of the cams 21 will engage the rollers 20 and elevate the table 13, the table falling each time the rollers are disengaged by the wing portions 23 of the cams, thus imparting a jarring action to the mold material in the mold.

However, due to the action of the spring 16a, the plunger 16 is pulled downward, thereby increasing the rapidity of the jarring action. Due to this arrangement, the speed of rotation of the cams 21 may be sensibly increased and the jarring table, nevertheless, be in position to be raised for the succeeding jarring motion.

The shaft 22 is offset from the vertical center line of the table 13 and from the axis of the shaft 18, so that the curvature of the wing portions 23 may be such that during rotation of the cams the point of contact of the portions 23 and the rollers 20 will be in substantially vertical alignment with the axis of the rollers at all times during the lifting movement of the cams 21, thereby applying the lifting force on the vertical axis of the plunger and imparting a true vertical lift to the jarring table without binding of the plunger 16 in the casing 17. Ordinarily, upward camming movement of the jarring table effected by cam devices that are positioned in vertical alignment with the axis of the rollers impart a sidewise movement to the plunger, thus causing a binding action. In my structure, however, this binding action is eliminated, or reduced to a minimum, by effecting true vertical movement of the jarring table by the cams as described.

The curved face 23 of the cam is struck from a center intermediate the shaft 22 and a vertical line drawn through the axis of the roller 20, so that initially the point of contact between the roller 20 and the cam face 23 is slightly to the left hand side of this center. The roller 20 therefore rests on a slightly down-hill surface, tending to cause it to roll toward the left, in opposition to horizontal drag or thrust by the cam face 23 tending to drag the roller toward the right, thereby substantially balancing the side thrusts and imparting a true vertical lift to the plunger 16. If the center of radius of the cam 23 were directly in vertical alinement with the axis of the roller 20, the roller 20 would be in a substantially balanced position upon the cam surface, and side thrust in that event by the cam 23 would, of course, be much less than if the center were located to the left of a vertical line through the axis of the roller 20, in which latter case, the roller would tend to move to the right and the horizontal thrust by the cam would be, therefore, aggravated and produce excessive binding in the guides.

The cam shaft 22 has connection through a clutch 25 with a driving shaft 26 that is driven by a motor 27. The shaft 26, also has driving connection through a clutch 28 with a shaft 29 that has suitable driving connection with a shaft 30 which carries a cam disc 31. The cam 31 actuates a clutch control lever 32 (Fig. 2) which has connection with the clutches 25 and 28. The shaft 30 has bevel gear connection with a shaft 33 that, in turn, drives a crankshaft 34 which carries crank members 35 that drive crank arms 36. Each crank arm 36 has pivotal connection through a pin or bolt 37 with a rocking lever 38.

The rocking levers 38 are pivoted at their lower ends to the base of the machine, as indicated at 39, and at their upper ends, the levers have sliding engagement with a shaft 40. The shaft 40 is slidably supported at each end between guide rails 41. Push rods 42 are secured to the shaft 40 and extend longitudinally beneath the table 8. The other ends of the push rods 42 are connected to a shaft 43 that is slidably supported at each end between guide rails 44, so that as the levers 38 are oscillated about their pivots 39, the push rods 42 will be reciprocated horizontally beneath the table 8.

It will be seen that the driving mechanism and the pusher mechanism are disposed beneath but within the confines of the table 8, thereby being protected from exposure to sand, dirt, etc. Also, the arrangement of the pusher mechanism results in proper functioning of the pusher without it projecting beyond the end of the table, and, also, without necessitating an increase in the length of the machine.

The push rods 42 carry pairs of pusher devices 45, 46 and 47 that are equally spaced longitudinally of the rods 42. Each of the pusher devices is provided with a spring-pressed arm 48 which extends upwardly through longitudinally-extending slots 60 in the table 8, the upper ends of such arms being positioned to the rear of the lugs 12a on the plates 12 for engagement therewith to slide the plates and the molds carried thereby forwardly during reciprocating movement of the push rods 42. The ends of the arms 48 are beveled to be depressed by the lugs 12a during retractive movement of the pusher rods.

One of the pusher devices 45 (as shown more clearly in Figs. 5 and 6) is provided, also, with a spring-pressed mold centralizer or stop bar 49 that extends upwardly through one of the slots 60 (Fig. 8) in the table 8 and forwardly of the lug 12a of the rearmost plate 12, whereby at least one of the lugs 12a are held between the bar 49 and the adjacent arm 48 during movement of the mold forwardly onto the jarring table. The bar 49 serves as a stop to check the forward sliding movement of the mold at the forward limit of movement of the pusher rods under the action of the cranks 35, thus accurately positioning the mold centrally of the jarring table.

The lower end of the bar 49 is provided with a lug 50 which is moved into position beneath the flanged upper end 62 of a bar release member 51 at the completion of the forward stroke of the push rods, the bar 49 being retracted by downward movement of the member 51, so that it clears the lug 12a on the return movement of the push rods. The release member 51 is secured to a lever 52 that is pivotally supported at one end, as indicated at 63. The free end of the lever is periodically engaged and depressed by a crank pin 53 carried by the shaft 34, thereby moving the member 51 downwardly in timed relation to the movement of the push rods.

In the present invention, I prefer to employ manual manipulation of the clutch control lever 32 to control the clutch 25, which is associated with the jarring mechanism, so that when operating upon various sizes and types of molds, and different mold materials, I may vary the extent to which the material in the molds will be subjected to the jolt-ramming operation while the mold is in position on the jarring table. To this end, the lever 32 is moved to the dotted line position a, Fig. 2; and after the mold is subjected to sufficient jarring action to compact the mold material, the lever is manually moved to the dotted line position b. Power is thus disconnected from the jarring mechanism by the operation of the clutch 25, while power is supplied to the cranks 35 by operation of the clutch 28 to cause reciprocation of the pusher rods 42.

During the jarring operation, however, the reciprocating pusher mechanism will be in the position shown, at which time a mold may be placed on the table 8 and pushed forwardly into position with the lugs 12a of the plate 12 between the bar 49 and the arm 48. Advancing movement of the push rods 42 will advance all the molds on the table through engagement of the arms 48 with the lugs 12a, and centralize the newly filled mold on the jarring table at the forward limit of movement of the push rods 42 as heretofore described. As the push rods approach their rearward limit of movement, the cam 31 will engage the lever 32 to gradually disengage the clutch 28. At the extreme rearward limit of movement of the push rods, the clutch 28 is fully disengaged automatically by the action of the cam 31, thereby completing a cycle of movement of the pusher mechanism.

Thus, by the use of the mold-supporting and guiding plates, I provide an apparatus capable of accommodating various types and sizes of molds, and one which may be operated at relative speeds for accommodation of the varying sizes of molds.

In Figs. 5, 6 and 7, I show the stop bar 49 and the pusher arm 48 provided with hood or skirt member 55 and 56, respectively, the hoods serving to prevent entry of foreign material such as sand, dirt, etc., into the pusher device.

Referring more particularly to Figs. 2 and 8, each of the slots 60 is covered by a protecting strip or plate 61 which extends the length of the slot, and is slidable horizontally of the table 8. The stop bar 49 and the pusher arms 48 slidably extends through the strips 61, and cause reciprocation of said strips when the pusher devices are actuated as heretofore described to advance the molds. The protecting plates 61 serve to prevent the passage of sand, dirt, etc., from the table 8 to the mechanism therebeneath, thereby protecting such mechanism from the deleterious action of the foreign material.

I claim as my invention:—

1. Molding apparatus comprising a table, a pusher device for advancing molds across said table, a stop bar mounted on said device in position to be engaged by a mold, and a pusher arm mounted on said device in position to engage the mold to hold it against the said stop and to advance it during forward movement of said device.

2. Molding apparatus comprising a table, a pusher device for advancing molds across said table, a stop bar mounted on said device in position to be engaged by a mold, a pusher arm mounted on said device in position to engage the mold to hold it against the said stop and to advance it during forward movement of said device, and means operative at the end of the advance movement of the said device for withdrawing the stop bar to inoperative position.

3. Molding apparatus comprising a table, a pusher device for advancing molds across said table, a stop bar mounted on said device in position to be engaged by a mold, a pusher arm mounted on said device in position to engage the mold to hold it against the said stop and to advance it during forward movement of said device, means operative at the end of the advance movement of the said device for withdrawing the stop bar to inoperative position, and means for effecting restoration of the said bar to operative position upon movement of said device toward retracted position.

4. Molding apparatus comprising a mold table, a device for advancing molds across said table, a stop bar carried by said device in position to be engaged by a mold, a pusher arm carried by said device in position to hold the mold against the said stop bar and to advance the same upon forward movement of the said device, the pusher arm being yieldable to permit movement of the mold into position against the stop bar.

5. Molding apparatus comprising a table, a mold member having a lug projecting from one side thereof, a pusher device for advancing molds across said table, a stop bar mounted on said device in position to engage one side of said lug, and a pusher arm mounted on said device in position to engage the other side of said lug to hold it against the said stop device and to advance the mold during forward movement of said device.

6. Molding apparatus comprising a table, a pusher device for advancing molds across said table, a jarring table for receiving said molds, interconnecting means between the molds and the pusher device for preventing over-travel of the molds upon advance thereof to the jarring table, and means operative at the end of the advance movement of the said device for rendering said interconnecting means inoperative.

7. The combination with a mold table and a jarring table having a longitudinally-extending guide device thereon, of a mold-supporting plate positioned on said mold table, means for detachably securing a mold to said plate, means for moving said plate longitudinally of said guide device, and a connection between said plate and said guide device for preventing relative vertical movements therebetween, but permitting relative longitudinal movements thereof.

8. The combination with a mold table and a jarring table having a longitudinally-extending guide device thereon, of a mold-supporting plate positioned on said mold table, means for detachably securing a mold to said plate, means for moving said plate longitudinally of said guide device, and an interlocking member on said plate having interfitting engagement with the guide device of said jarring table to prevent relative vertical movement between the mold plate and the jarring table during a jarring operation.

9. Molding apparatus comprising a mold table, a reciprocable pusher device for advancing molds across the table, a pusher arm mounted on said device in position to engage a mold and advance the same during the forward movement of the pusher device, and means for yieldably urging the pusher arm toward mold-engaging position, whereby the said arms is adapted to be depressed when passing a succeeding mold during retractive movement of the said pusher device.

10. Molding apparatus comprising a mold table, a reciprocable pusher device for advancing molds across the table, a pusher arm mounted on said device in position to engage a mold and advance the same during the forward movement of the pusher device, and means for yieldably urging the pusher arm toward mold-engaging position, whereby the said arm is adapted to be depressed when passing a succeeding mold during retractive movement of the said pusher device, the mold-engaging end of said arm being inclined rearwardly.

11. In a molding machine, a mold table, a jarring table associated therewith and mounted for vertical movement, means for advancing molds across the mold table along the longitudinal center line thereof into position on the jarring table, and means disposed adjacent to the ends of said jarring table, at points spaced in longitudinal alignment with the said center line thereof, for elevating the table to effect a jarring operation.

12. In a molding machine, a mold table, a jarring table associated therewith and mounted for vertical movement, means for advancing molds across the mold table along the longitudinal center line thereof into position on the jarring table, means disposed adjacent to the ends of said jarring table, at points spaced in longitudinal alignment with the said center line thereof, for elevating the table to effect a jarring operation, and stop means carried by said advancing means and operatively engaging said molds for preventing overtravel of the molds past a central position on the jarring table.

13. In a molding machine, a mold table, a jarring table associated therewith and mounted for vertical movement, means for advancing molds across the mold table along the longitudinal center line thereof into position on the jarring table, cam rollers supported from the jarring table and disposed adjacent to the ends thereof, and a rotatable camming member cooperating with each of said rollers to lift the jarring table intermittently, to effect a jarring operation, the axes of said rollers being arranged parallel to the center line of movement of the molds and in vertical alignment therewith.

14. In a molding machine, a mold table, a jarring table associated therewith and mounted for vertical movement, means for advancing molds across the mold table along the longitudinal center line thereof into position centrally of the jarring table, cam rollers supported from the jarring table and disposed adjacent to the ends thereof, the axes of said rollers being arranged parallel to the center line of movement of the molds and in vertical alignment therewith, and a rotatable camming member having a curved portion at its outer end for operating against each of said rollers to lift the jarring table intermittently, to effect a jarring operation, the axes of said camming members being horizontally offset from the axes of said rollers.

In testimony whereof I, the said SAMUEL BLAINE STINE, have hereunto set my hand.

SAMUEL BLAINE STINE.